(12) United States Patent
Makel

(10) Patent No.: US 8,904,780 B1
(45) Date of Patent: Dec. 9, 2014

(54) TEMPERATURE-DRIVEN MECHANICAL SYSTEM

(76) Inventor: David Drake Makel, Nellysford, VA (US)

( * ) Notice: Subject to any disclaimer, the term of this patent is extended or adjusted under 35 U.S.C. 154(b) by 128 days.

(21) Appl. No.: 13/570,910

(22) Filed: Aug. 9, 2012

Related U.S. Application Data

(60) Provisional application No. 61/521,659, filed on Aug. 9, 2011.

(51) Int. Cl.
*F01B 29/10* (2006.01)

(52) U.S. Cl.
USPC ............ 60/527; 60/529; 160/1; 160/6; 160/9; 160/10

(58) Field of Classification Search
CPC ........ E05F 15/20; E05F 15/2007; F03G 7/06; F03G 7/065
USPC ......... 60/527, 529; 160/1, 6, 7, 9, 10; 40/492, 40/493
See application file for complete search history.

(56) References Cited

U.S. PATENT DOCUMENTS

| | | | | |
|---|---|---|---|---|
| 2,489,879 A | * | 11/1949 | Grebe | 49/2 |
| 2,798,321 A | * | 7/1957 | Duff | 40/493 |
| 3,860,055 A | * | 1/1975 | Wild | 160/1 |
| 4,210,279 A | * | 7/1980 | McSwain | 236/49.5 |
| 4,243,175 A | * | 1/1981 | McSwain | 236/49.5 |
| 4,279,240 A | * | 7/1981 | Artusy | 126/579 |
| 4,449,563 A | * | 5/1984 | Toda et al. | 160/184 |
| 4,513,358 A | * | 4/1985 | Lemme | 362/276 |
| 4,644,990 A | * | 2/1987 | Webb et al. | 160/5 |
| 4,754,696 A | * | 7/1988 | Sarazen et al. | 454/256 |
| 5,063,984 A | * | 11/1991 | Cherveny | 160/7 |
| 5,275,219 A | * | 1/1994 | Giacomel | 160/6 |
| 5,816,306 A | * | 10/1998 | Giacomel | 160/6 |
| 2002/0050530 A1 | * | 5/2002 | Stefano et al. | 236/49.3 |
| 2008/0178526 A1 | * | 7/2008 | Browne et al. | 49/82.1 |
| 2009/0167971 A1 | * | 7/2009 | Powers et al. | 349/18 |
| 2009/0284039 A1 | * | 11/2009 | Alacqua et al. | 296/97.4 |

FOREIGN PATENT DOCUMENTS

| | | | |
|---|---|---|---|
| GB | 2009294 A | * | 6/1979 |
| JP | 04258491 A | * | 9/1992 |

* cited by examiner

*Primary Examiner* — Thomas Denion
*Assistant Examiner* — Xiaoting Hu
(74) *Attorney, Agent, or Firm* — Sunstein Kann Murphy & Timbers LLP

(57) ABSTRACT

A temperature-driven mechanical system includes a first effector, made of temperature-induced shape-changing material, having first and second ends and a longitudinal axis running through the ends, as well as a suspension system that mounts an assembly including the effector, to support rotation of the assembly about the longitudinal axis. The suspension system has a first rotational limit stop associated with a first angular position of the assembly at or below a first temperature limit and a second limit stop associated with a second angular position of the assembly at or above a second temperature limit. An array of such systems is similarly provided.

20 Claims, 14 Drawing Sheets

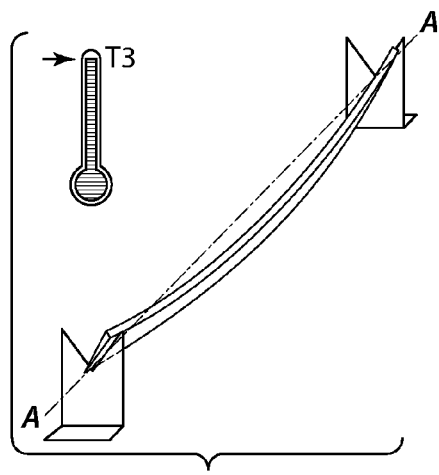
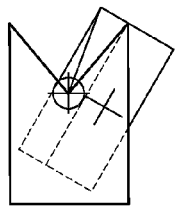
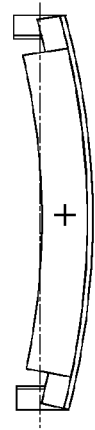
Fig. 5a  Fig. 5b  Fig. 5c
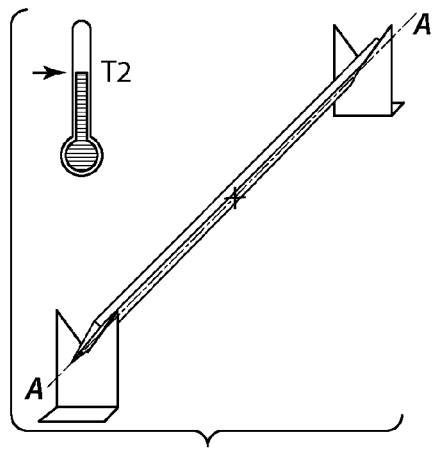
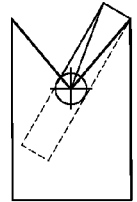
Fig. 6a  Fig. 6b  Fig. 6c
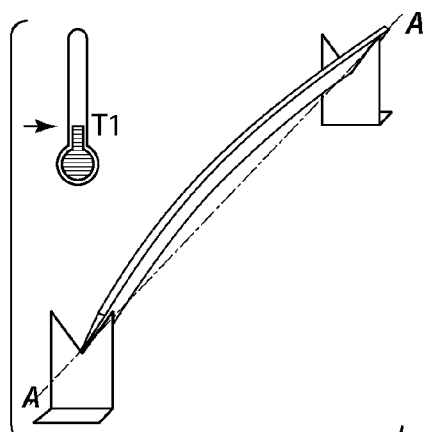
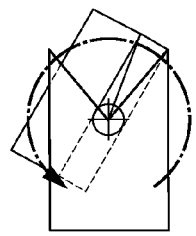
Fig. 7a  Fig. 7b  Fig. 7c

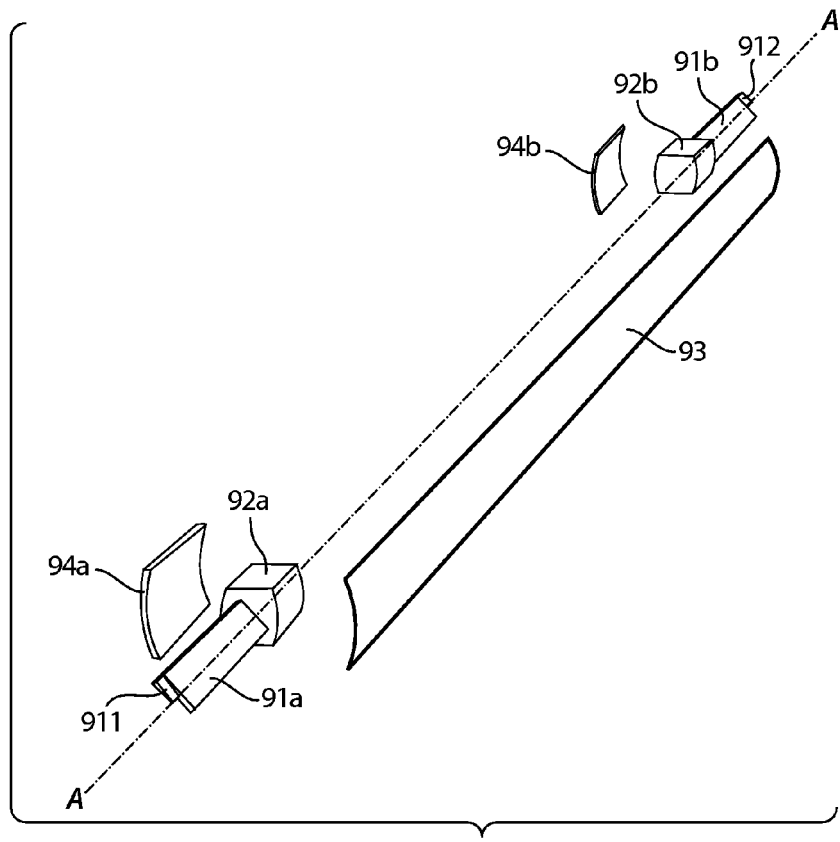
Fig. 9
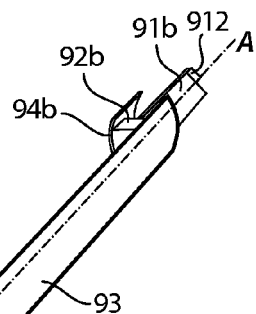
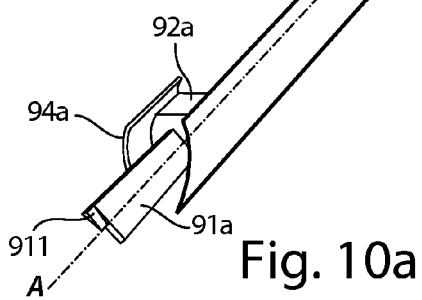
Fig. 10a
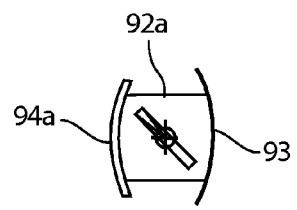
Fig. 10b

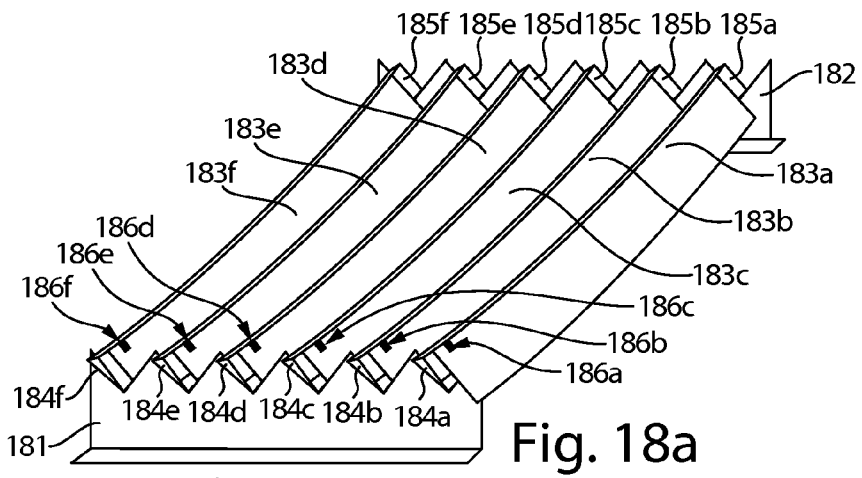
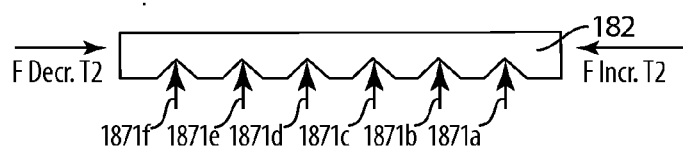
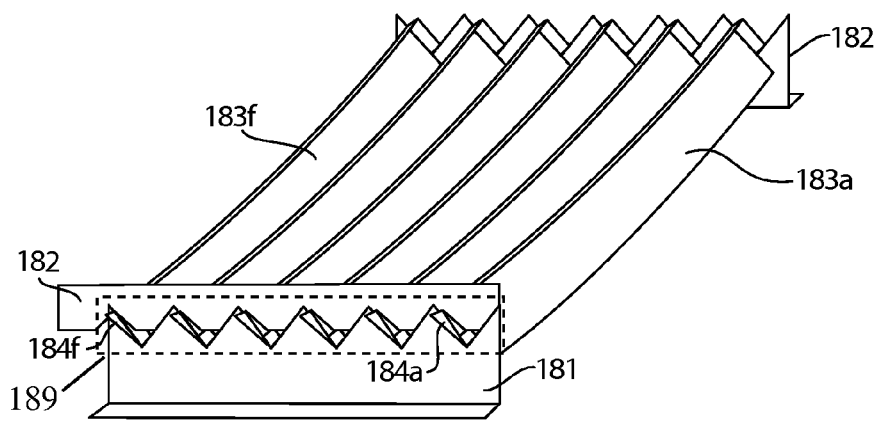
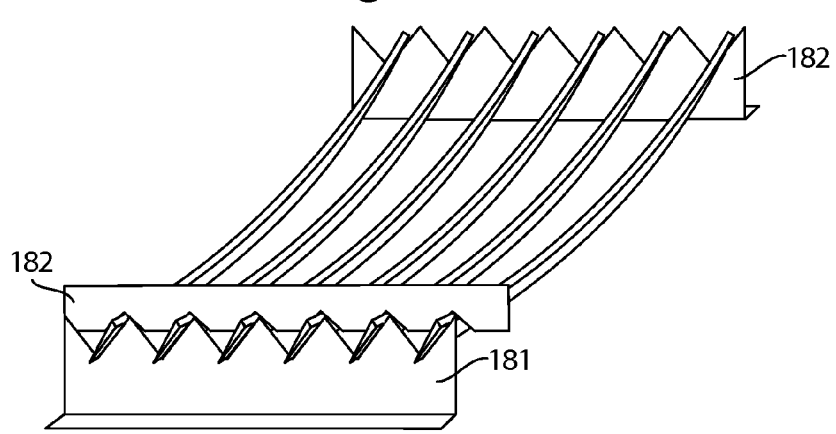

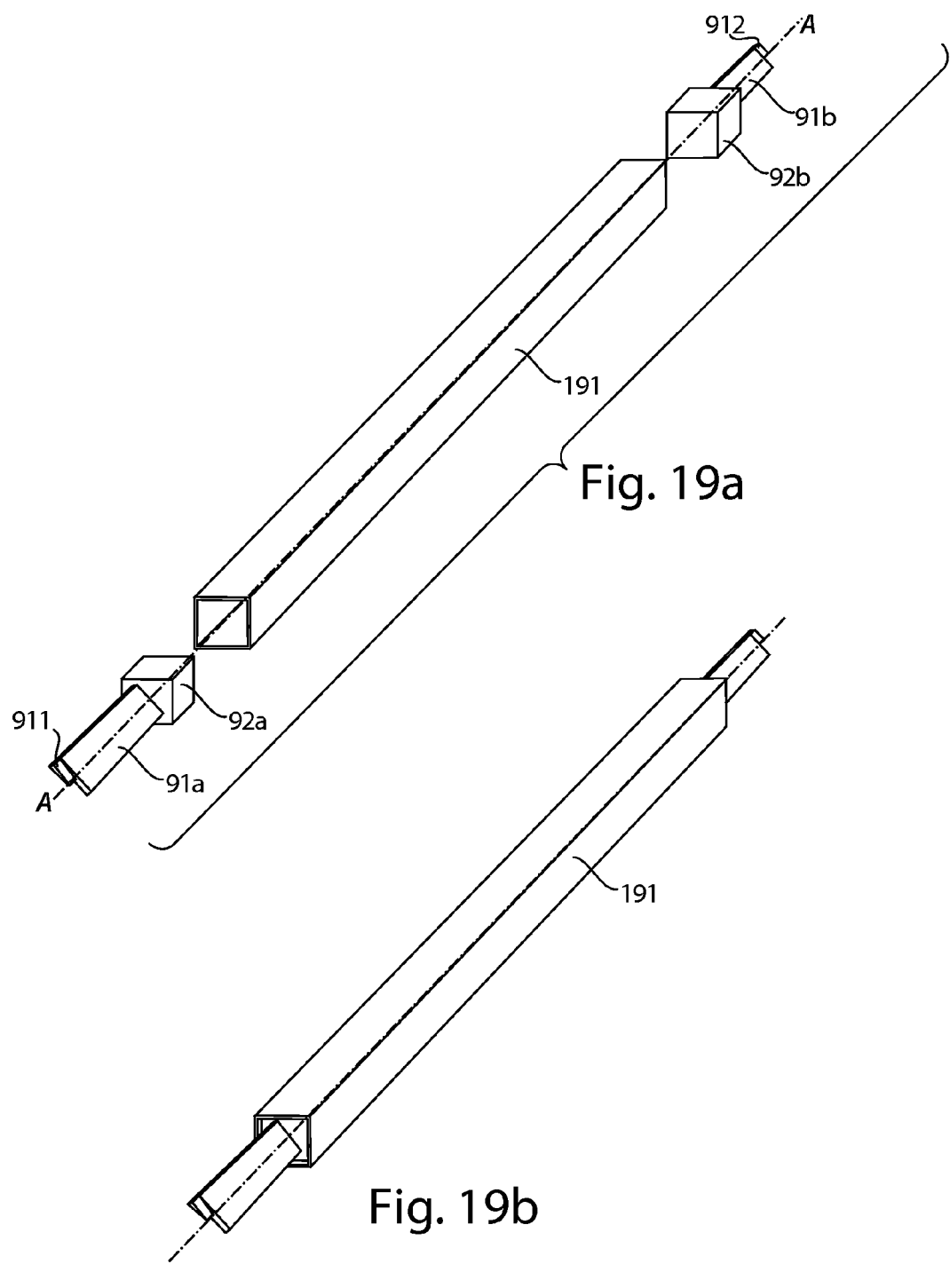

TEMPERATURE-DRIVEN MECHANICAL SYSTEM

RELATED APPLICATION

The present application claims the benefit of, and priority from, U.S. provisional application No. 61/521,659, filed Aug. 9, 2011, which application is hereby incorporated herein by reference.

TECHNICAL FIELD

The present invention relates to systems employing temperature-induced shape-changing materials, such as bi-metallic strips and shape-memory alloys, to perform a mechanical function, more particularly to such systems configured to operate a mechanism such as a shutter.

BACKGROUND ART

It is known in the prior art to use bi-metallic strips and shape-memory alloys in a range of mechanical applications. For example, patent application with publication number US 2003/0226359 discloses a heat-driven motor employing nitinol.

SUMMARY OF THE EMBODIMENTS

In a first embodiment of the invention there is provided a temperature-driven mechanical system. This embodiment includes a first effector, made of temperature-induced shape-changing material, having first and second ends and a longitudinal axis running through at least one of the ends, as well as a suspension system that mounts an assembly including the effector, to support rotation of the assembly about the longitudinal axis. The suspension system has first and second rotation limit stops to limit rotation of the assembly to less than 180 degrees about the longitudinal axis, wherein the first limit stop is associated with a first angular position of the assembly at or below a first temperature limit and the second limit stop is associated with a second angular position of the assembly at or above a second temperature limit. Furthermore, the suspension is configured so that at the first temperature limit the first effector assumes a first shape that causes the center of gravity of the assembly to be located on a first side of a vertical plane passing through the longitudinal axis and at the second temperature limit the first effector assumes a second shape that causes the center of gravity of the assembly to be located on a second side of the vertical plane.

In a further embodiment, (i) the assembly includes a second effector having first and second ends and the longitudinal axis also runs through at least one of the first and second ends of the second effector and (ii) the second effector is disposed in the assembly so that the effectors in the assembly exhibit bilateral symmetry.

Alternatively or in addition, the system further includes a shutter element mounted in the assembly.

In a further embodiment, the system further includes a counterweight mounted in the assembly configured to cause the assembly to have a center of gravity located in the vertical plane passing through the longitudinal axis at a transition temperature between the first temperature limit and the second temperature limit.

Optionally, the shutter element is implemented as rectangular parallelepiped having a major axis that is parallel to the axis of rotation, and two adjacent faces of the parallelepiped display distinct messages, so that temperature of the effectors determines which of the distinct messages is visible to a viewer.

In a further related embodiment, there is provided an array of systems as described in any of the foregoing embodiments. The array is configured so that the longitudinal axes of the systems in the array are substantially parallel to one another. Optionally, the array is configured so that the longitudinal axes of the systems are substantially co-planar.

In a further related embodiment, a plurality of assemblies of the systems in the array are coupled to one another so that they rotate in unison. In a further related embodiment, the array further includes a temperature limit adjustment mechanism configured to provide a torque to the assemblies with respect to their axes of rotation so as to shift the temperature limits at which centers of gravity of the assemblies in the array generate torque sufficient to cause rotation of the assemblies. Optionally, the temperature limit adjustment mechanism includes a spring with an adjustable amount of force. Alternatively, the temperature limit adjustment mechanism includes a weight with an adjustable lever arm. A representative location for providing the temperature limit adjustment mechanism in the form of a spring with an adjustable amount of force or a weight with an adjustable lever arm is illustrated by the box of dashed lines shown as item 189 in FIG. 18c.

In a further related embodiment, the array further includes a manual override assembly configured to cause the shutters to move into and be retained in a state determined by manual operation. Similarly, the box of dashed lines shown as item 189 in FIG. 18c also indicates a representative location for a manual override assembly.

In another related embodiment, each of the shutter elements is implemented as a rectangular parallelepiped having a major axis that is parallel to the axis of rotation, and two adjacent faces of the parallelepiped display distinct messages, so that temperature of the effectors determines which of the distinct messages is visible to a viewer.

In another related embodiment of the system, the shutter is reflective.

In another related embodiment of the system, the shutter is light-filtering in that it is configured to selectively pass primarily light falling within a selected frequency range.

In another related embodiment of the system, the shutter is configured to regulate air flow.

In another related embodiment of the system, the first and second rotation limit stops have separately adjustable angular positions, about the longitudinal axis, relative to the vertical plane.

Similarly, in another related embodiment of the array of systems, the first and second rotation limit stops have separately adjustable angular positions, about the longitudinal axis, relative to the vertical plane. In a further related embodiment, the plurality of assemblies are coupled to one another via an interconnect member that is coupled to each shutter of the array. The interconnect member travels in first and second directions transverse to the axes of rotation of the assemblies, and the directions depend on the direction of rotation of shutters in the array with change in temperature. In this embodiment, the array further comprises adjustable first and second translation limit stops on travel of the interconnect in the first and second directions.

BRIEF DESCRIPTION OF THE DRAWINGS

The foregoing features of embodiments will be more readily understood by reference to the following detailed description, taken with reference to the accompanying drawings, in which:

FIGS. 2-7 show the effects of temperature on the simplified actuator of FIGS. 1a-1f when the actuator is mounted on a simplified suspension system, and the temperature shifts from an initial temperature T1, to an intermediate temperature T2, to an elevated temperature T3, and then returns to the intermediate temperature T2, and finally back to the initial temperature T1;

FIGS. 5a-5c present a perspective view, an end view, and a top view of the actuator of FIGS. 1a-1f, still at temperature T3, wherein the actuator has now flopped to the right-hand position as a result of the shifted position of its center of gravity shown in FIGS. 4a-4c;

FIGS. 6a-6c present a perspective view, an end view, and a top view of the actuator of FIGS. 1a-1f, now returned to temperature T2, wherein the actuator has again assumed a straight shape, and remains in the right-hand position;

FIGS. 7a-7c present a perspective view, an end view, and a to view of the actuator of FIGS. 1a-1f, at the initial temperature T1, wherein the actuator has returned to the shape curved in the first direction, and wherein the center of gravity of the actuator has shifted back to the left hand side of the axis of rotation.

FIG. 9 shows an exploded view of a shutter element assembly in accordance with an embodiment of the present invention;

FIG. 10 shows the shutter element assembly of FIG. 9 after being assembled;

FIG. 11a shows a perspective view of the shutter element assembly of FIG. 10 in a suspension system at initial temperature T1, in accordance with a further embodiment of the present invention, wherein the actuators are curved in a first direction and the assembly lies in the left-hand position;

FIG. 11b shows an end view of the embodiment of FIG. 11a;

FIG. 12a shows a perspective view of the embodiment of FIG. 10 in the suspension system of FIG. 11, but now at an intermediate temperature slightly above the transition temperature T2, at which the actuators previously assumed a straight shape, so that now a resulting torque has moved the assembly to a center position;

FIG. 12b is an end view of the embodiment of FIG. 12a;

FIG. 13b is an end view of the embodiment of FIG. 13a;

FIGS. 18a-18d illustrate an array of shutter element assemblies, in which each shutter element assembly is implemented as a single actuator, and wherein the assemblies are coupled together by an interconnect member;

FIGS. 19a-19c illustrate a shutter element assembly wherein the shutter element is a rectangular parallelepiped.

DETAILED DESCRIPTION OF SPECIFIC EMBODIMENTS

Definitions. As used in this description and the accompanying claims, the following terms shall have the meanings indicated, unless the context otherwise requires:

The term "temperature-induced shape-changing material" means a material that changes shape in response to a change in temperature of the material. Temperature-induced shape-changing materials include strips or other shapes including a plurality of layers of materials having differing coefficients of expansion, such as bi-metallic strips, and shape-memory alloys and other shape-memory materials, such as nitinol.

The term "shutter element" means a member presenting a surface configured to filter or reflect incident electromagnetic radiation, such member being mountable in an assembly that includes an effector (also referred to herein as an "actuator") made of temperature-induced shape-changing material having first and second ends, the assembly being rotatable about a longitudinal axis running through at least one of the ends of the effector.

Included where pertinent in the figures is a rendition of a simple thermometer to indicate relative temperature for the particular figure. Three relative temperatures are indicated. T2 is the transition temperature at which an effector made of temperature-induced shape-changing material is essentially straight. In a completely idealized, balanced and rigid system this is the temperature at which a rotating assembly in which the effector is mounted is completely balanced and, essentially, metastable. In various embodiments herein, a change in temperature of the effector causes a change in the direction of its curvature (to the left or to the right, for example) resulting in a net torque in the appropriate direction caused by a corresponding movement of the center of gravity of the assembly to one side or other of its axis of rotation. T1 is a low temperature (relative to T2) at which the effector is curved in a first direction. T3 is a high temperature (relative to T2) at which the bar is curved in a second direction.

The skewed (45 deg) cross represents the approximate location of the center of gravity (CG) of the rotating assembly. The small horizontal/vertical cross with a small circle depicts the axis of rotation (AR) of the assembly.

To reduce the number of lines and relative complexity of the figures the items have been depicted as if only the end supports are transparent. This is a compromise from a traditional mechanical drawing, but by reducing the complexity it makes the figures, it is believed, easier to comprehend.

Figure 1A:
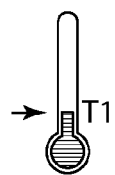
FIGS. 1a-1f show the effects of temperature on shape of a simplified actuator in accordance with a simplified embodiment of the present invention.
Figure 1B:
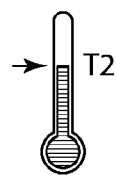
Figure 1C:
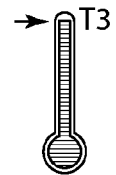
Figure 1D:
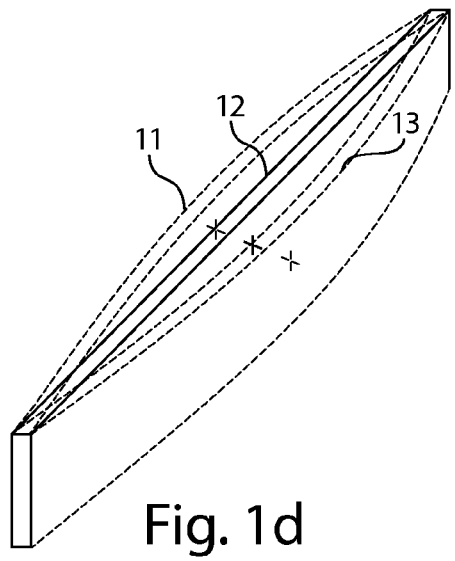
Figure 1E:
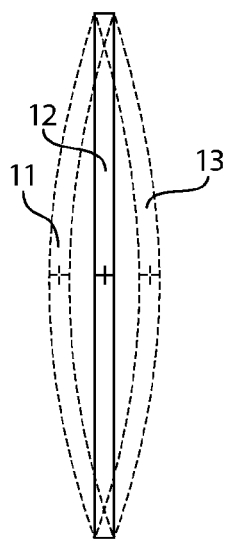
Figure 1F:
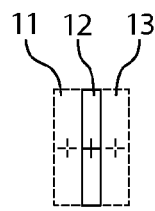

FIGS. 1a-1f show the effects of temperature on shape of a simplified actuator in accordance with a simplified embodiment of the present invention. FIGS. 1a, 1b, and 1c represent temperatures respectively at T1, T2, and T3 as described above. As previously discussed, FIG. 1d is a perspective view showing positions of the effector, which is made of temperature-induced shape-changing material, at each of these temperatures. In position 12, the effector is at temperature T2, and is straight. In position 11, the effector is at temperature T1 and is curved in a first direction. In position 13, the effector is at temperature T3 and is curved in a second direction. In FIG. 1e, the same positions 11, 12, and 13 are shown from a top view, whereas in FIG. 1f the same positions are shown in an end view. In each of FIGS. 1d, 1e, and 1f the center of gravity of the effector is shown for each of the temperatures by the "+" or "X" symbol. Of course, as the effector bends as a function of temperature its center of gravity migrates as indicated by the successive locations of the "+" or "X" symbols.

FIGS. 2-7 show the effects of temperature on the simplified actuator of FIGS. 1a-1f when the actuator is mounted on a simplified suspension system, and the temperature shifts from an initial temperature T1, to an intermediate temperature T2, to an elevated temperature T3, and then returns to the intermediate temperature T2, and finally back to the initial temperature T1.

Figure 2A:
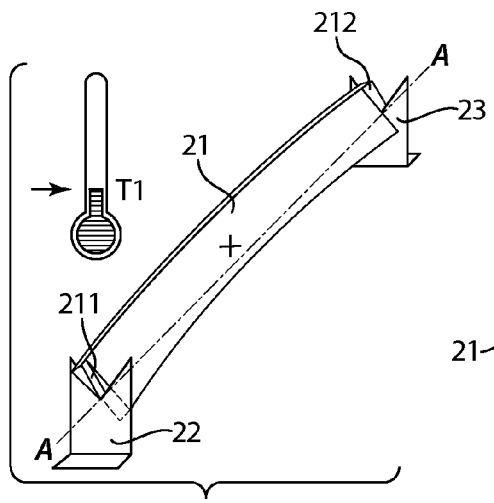
In FIG. 2a, the actuator is shown in a perspective view in the suspension system in the left-hand position, at initial temperature T1, wherein the actuator is curved in a first direction.

In FIG. 2a, the actuator is identified as item 21 and is shown in a perspective view in the suspension system in the left-hand position, at initial temperature T1. The actuator 21 includes end pieces 211 and 212 that present sharp edges to the suspension system mounts 22 and 23 respectively, so that the actuator can rotate about the longitudinal axis AA. Each system mounts 22 and 23 includes a V-notch, a side of which is encountered by the end piece 211 and 212 respectively to limit rotational motion of the effector in a given direction. The curvature of the effector 21 in the first direction at temperature T1 causes the actuator to be at rest in the left-hand position in the suspension system.

Figure 2B:
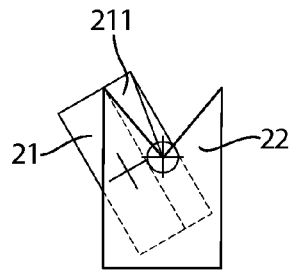
FIG. 2b is an end view of the actuator of FIG. 2a, in which the position of its center gravity is shown relative to the suspension system and in particular relative to the axis of rotation.
Figure 2C:
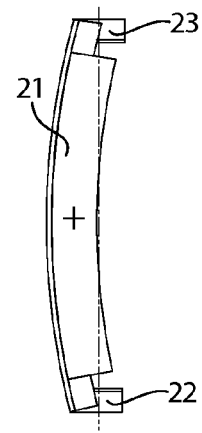
FIG. 2c is a top view of the actuator of FIG. 2a, showing the manner in which the actuator is bent relative to its axis of rotation.

FIG. 2b is an end view of the actuator of FIG. 2a. FIG. 2c is a top view of the actuator of FIG. 2a. In each of FIGS. 2a, 2b, and 2c the position of the center gravity is shown relative to the suspension system and in particular relative to the axis of rotation by the "+" or "X" symbol. It can be seen that the center of gravity lies to the left of the axis of rotation of the actuator. As a result, gravity has the effect of applying a torque to maintain the actuator against the left side of the V-notch of mount 22.

Figure 3A:
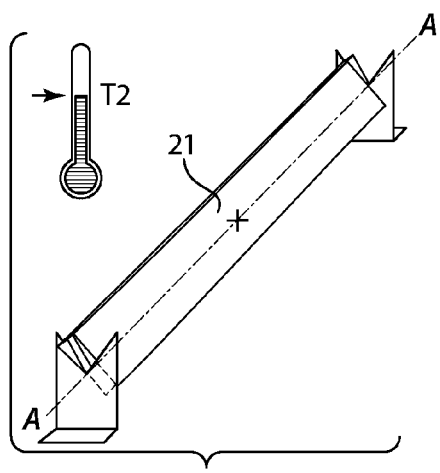
FIGS. 3a-3c similarly present a perspective view, an end view, and a top view of the actuator of FIGS. 1a-1f at temperature T2, which is above temperature T1 and at which the actuator is straight, with the actuator still in the left-hand position.
Figure 3B:
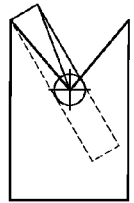
Figure 3C:

FIGS. 3a-3c similarly present a perspective view, an end view, and a top view of the actuator of FIGS. 1a-1f at temperature T2, which is above temperature T1 and at which the actuator is straight, with the actuator still in the left-hand position. It can be seen at this point that the center of gravity of the actuator lies along the axis of rotation AA. As a result, gravity has the effect of applying no torque to the actuator, which remains at rest against the left side of the V-notch of mount 22.

Figure 4A:
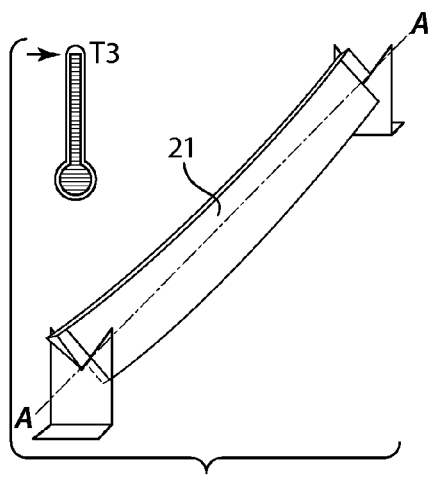
FIGS. 4a-4c present a perspective view, an end view, and a top view of the actuator of FIGS. 1a-1f at temperature T3, which is above temperature T2 and at which the actuator is now curved in a second direction, with the actuator still in the left-hand position, but wherein the center of gravity of the actuator has shifted to the right hand side of the axis of rotation.
Figure 4B:
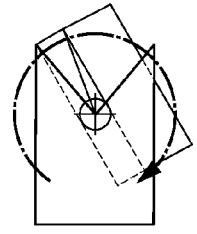
Figure 4C:
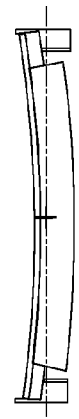

FIGS. 4a-4c present a perspective view, an end view, and a top view of the actuator of FIGS. 1a-1f at temperature T3, which is above temperature T2 and at which the actuator is now curved in a second direction, with the actuator still in the left-hand position, but wherein the center of gravity of the actuator has shifted to the right-hand side of the axis of rotation. At some point the migration of the center of gravity to the right-hand side of the axis of rotation will be sufficiently great to cause gravity to apply torque in an amount sufficient to cause rotation of the actuator 21 about the axis of rotation AA.

FIGS. 5a-5c present a perspective view, an end view, and a top view of the actuator of FIGS. 1a-1f, still at temperature T3, wherein the actuator has now flopped to the right-hand position as a result of the shifted position of its center of gravity shown in FIGS. 4a-4c.

FIGS. 6a-6c present a perspective view, an end view, and a top view of the actuator of FIGS. 1a-1f, now returned to temperature T2, wherein the actuator has again assumed a straight shape, and remains in the right-hand position. Again, as in FIG. 3, the center of gravity of the actuator lies along the axis of rotation, so gravity applies no net torque to the actuator, which remains at rest in the right-hand position.

FIGS. 7a-7c present a perspective view, an end view, and a top view of the actuator of FIGS. 1a-1f, at the initial temperature T1, wherein the actuator has returned to the shape curved in the first direction, and wherein the center of gravity of the actuator has shifted back to the left hand side of the axis of rotation. This shifted center of gravity again causes the application of torque, this time to cause rotation in the counter-clockwise direction, so as to cause the actuator 21 to flop back again to the left-hand position in the mount 22, as indicated in FIG. 2.

FIGS. 2-7 therefore show a cycle in which a temperature swing can cause the effector to move from one side of the V-notch to the other in mount 22.

Figure 8A:
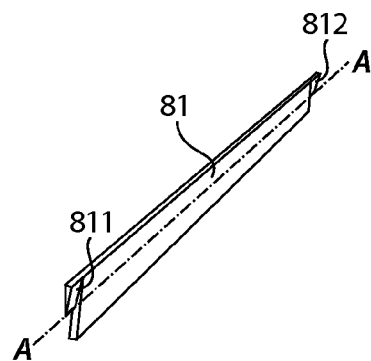
FIG. 8a provides detail of the actuator of FIGS. 1a-1f.
Figure 8B:
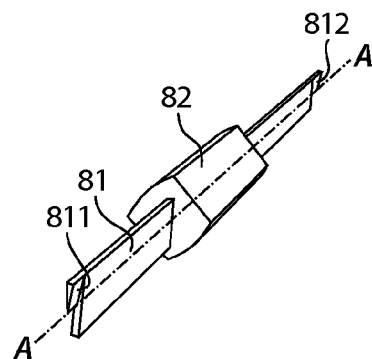
FIG. 8b shows how such an actuator may mount an object to be driven by the actuator.
Figure 8C:
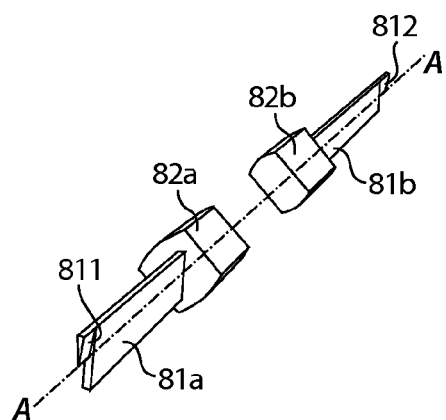
FIG. 8c shows how the actuator of FIG. 8b may be considered as a pair of actuators each mounting a hub.

FIG. 8a provides detail of the actuator of FIGS. 1a-1f; the actuator, identified as item 81, includes an axis of rotation AA defined by sharp edges of the end pieces 811 and 812. FIG. 8b shows how such an actuator may mount an object 82 to be driven by the actuator. FIG. 8c shows how the actuator of FIG. 8b may be sliced in half at its midpoint so as to be considered as a pair of actuators 81a and 81b, each mounting a hub 82a and 82b respectively and having a common axis of rotation AA.

FIG. 9 shows how a structural arrangement similar to that shown in FIG. 8c can result in a shutter element assembly driven by a pair of actuators made of temperature-induced shape-changing material. In particular, FIG. 9 is an exploded view of a shutter element assembly in accordance with an embodiment of the present invention. It includes symmetrically disposed actuators 91a and 91b, which include end pieces 911 and 912 for mounting the assembly in a V-mount similar to that illustrated in FIGS. 2-7. The hubs 92a and 92b, coupled to the effectors 91a and 91b respectively, are used to mount the shutter element 93. Counterweights 94a and 94b are configured so that the entire assembly experiences a net torque of zero about axis AA when the effectors 91a and 91b are at the transition temperature T2 and are therefore straight. FIG. 10a is a perspective view of the shutter element assembly of FIG. 9 after being assembled. FIG. 10b is an end view of the shutter element assembly of FIG. 9; this view shows that the center of gravity of the entire assembly lies on the horizontal axis when the effectors are straight, so that the assembly experiences no net torque at the transition temperature T2.

Figures 11A, 11B:
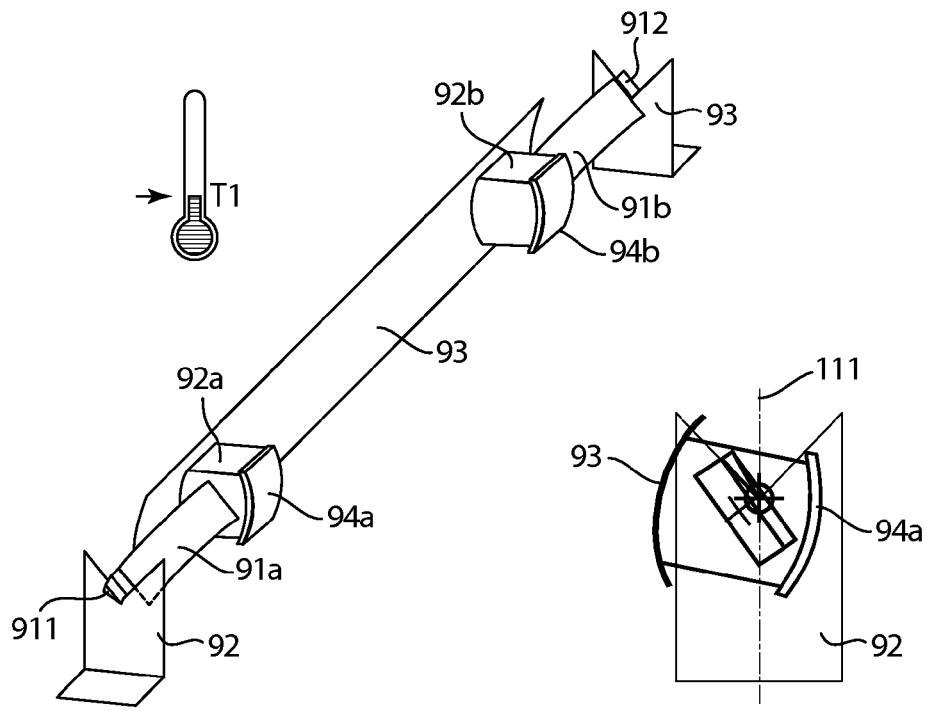

FIG. 11a shows a perspective view of the shutter element assembly of FIG. 10 in a suspension system at initial temperature T1, in accordance with a further embodiment of the present invention, wherein the actuators are curved in a first direction and the assembly lies in the left-hand position on mount 92. This figure is generally analogous to FIG. 2. Thus the end pieces 911 and 912 lie against corresponding sides of the V-notch in mounts 92 and 93 respectively. FIG. 11b shows an end view of the embodiment of FIG. 11a, and it can be seen that the center of gravity of the assembly lies to the left of the axis of rotation of the assembly and more particularly to the left of vertical plane 111 passing through the axis of rotation.

Figures 12A, 12B:
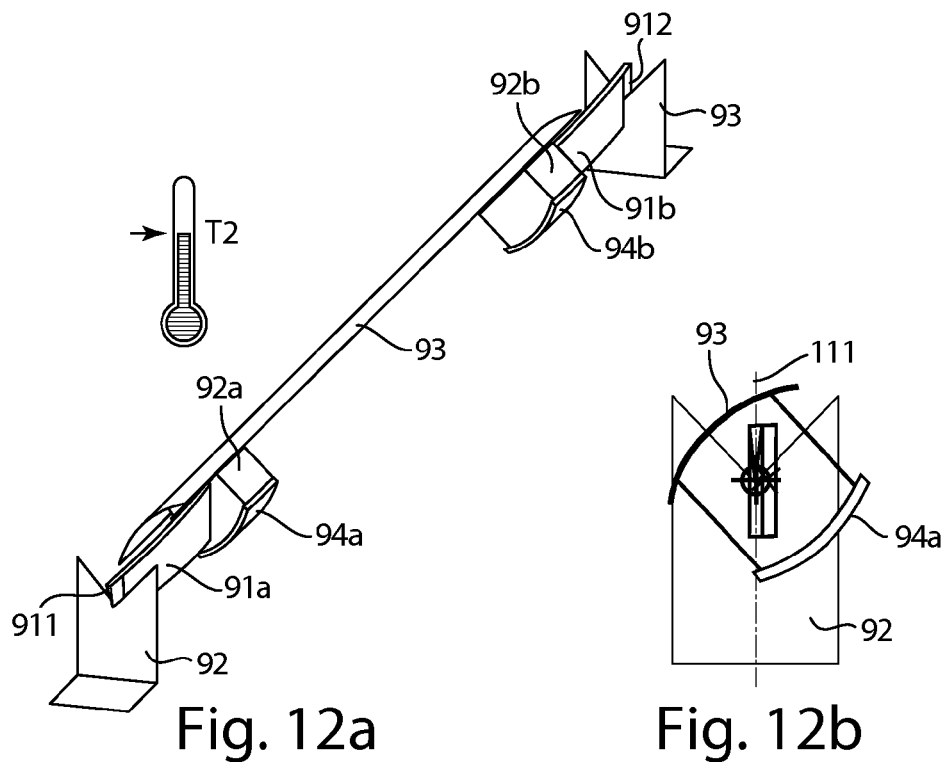
Figure 13A:
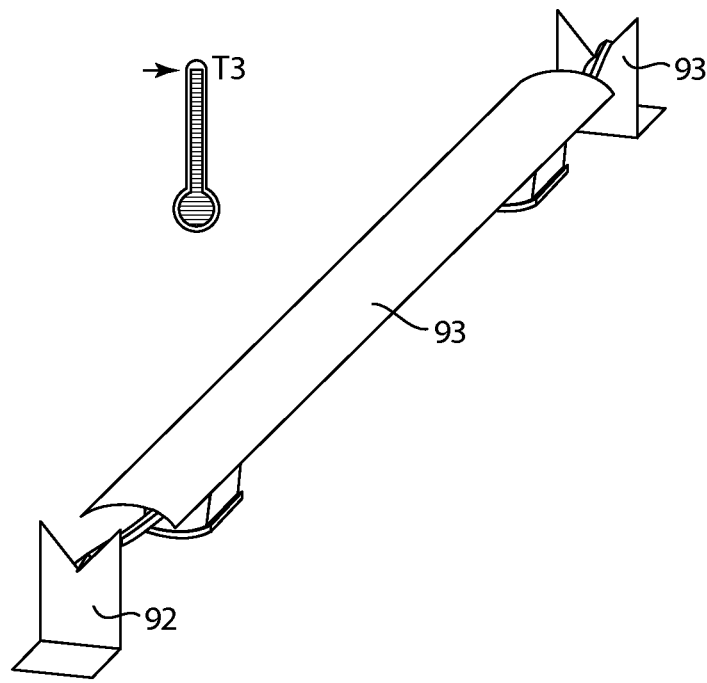
FIG. 13a shows a perspective view of the embodiment of FIG. 10 in the suspension system of FIG. 11, but now at the elevated temperature T3, wherein the actuators are now curved in the second direction and the assembly lies in the right-hand position.
Figure 13B:
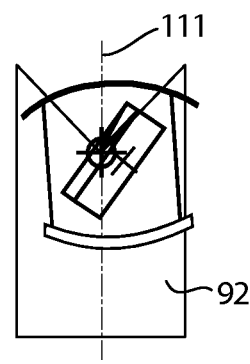

FIG. 12a shows a perspective view of the embodiment of FIG. 10 in the suspension system of FIG. 11, but now at an intermediate temperature slightly above the transition temperature T2, at which the actuators previously assumed a straight shape, so that now the actuators have started to curve in the second direction and a resulting torque has moved the assembly to a center position in the V-notches of mounts 92 and 93. FIG. 12b is an end view of the embodiment of FIG. 12a. FIG. 13a shows a perspective view of the embodiment of FIG. 10 in the suspension system of FIG. 11, but now at the elevated temperature T3, wherein the actuators are now curved in the second direction and the assembly lies in the right-hand position. As shown in FIG. 13a, the shutter element 93 is approximately horizontal, corresponding to being in a closed position, whereas in FIG. 11b, the shutter is at approximately 90° to horizontal and therefore in an open position. It can be seen in FIG. 13b, which is an end view of the embodiment of FIG. 13a, that the center of gravity of the assembly lies to the right of vertical plane 111 passing through the axis of rotation of the assembly.

Figure 14:
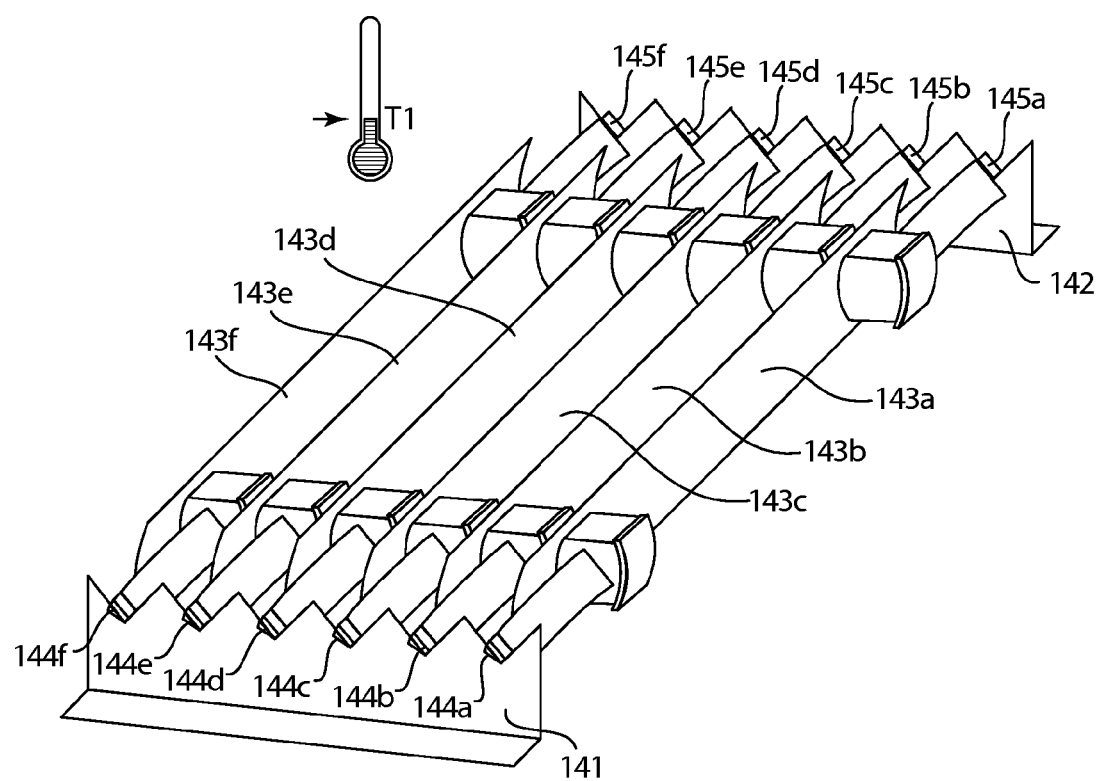
FIG. 14 shows an array of shutter element assemblies in a suspension system at initial temperature T1.

FIG. 14 shows an array of shutter element assemblies in a suspension system at initial temperature T1. The array includes suspension mounts 141 and 142 which provide a separate V-notch for each end piece 144a, 144b, 144c, 144d, 144e, and 144f on the side of mount 141 and for each end piece 145a, 145b, 145c, 145d, 145e, and 145f on the side of mount 142. Thus the shutter elements 143a, 143b, 143c, 143d, 143e, and 143f are approximately parallel to one another and approximately coplanar and can be configured to move in the same manner as temperature changes. At temperature T1, the end pieces are resting on the left side of the V-notches as a result of the shape, curved in the first direction, assumed by the effectors, and the shutter elements are in an open position.

Figure 15:
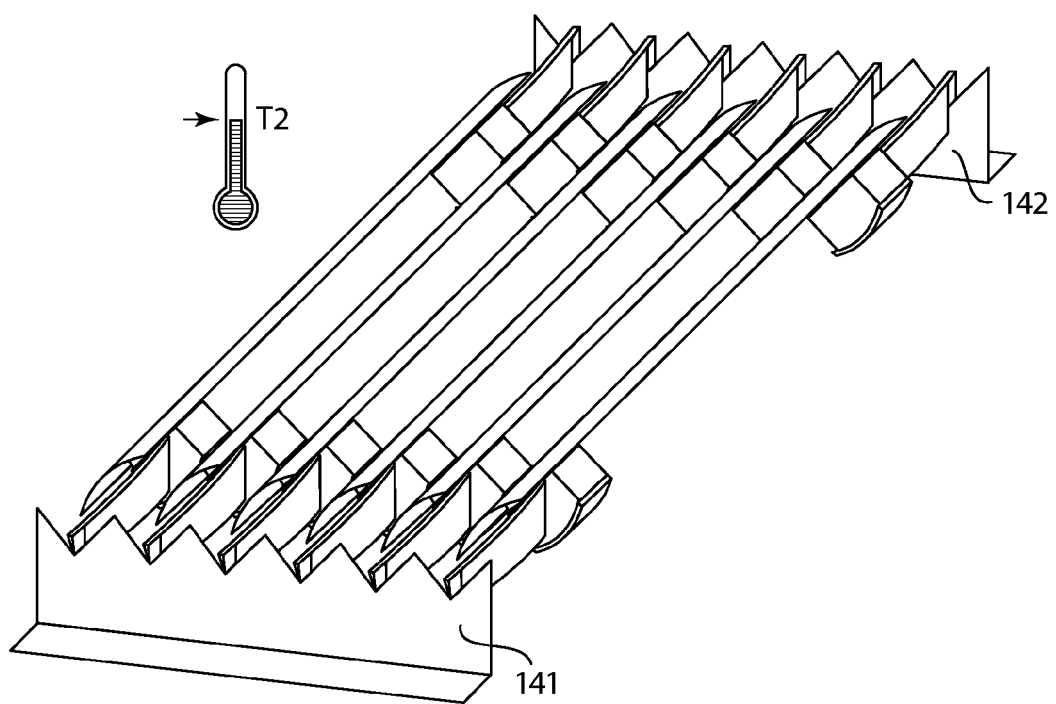
FIG. 15 shows the array of shutter element assemblies of FIG. 14 at an intermediate slightly above the transition temperature T2 at which the actuators previously assumed a straight shape, so that now a resulting torque has moved the assembly to a center position.

FIG. 15 shows the array of shutter element assemblies of FIG. 14 at an intermediate temperature slightly above the transition temperature T2 at which the actuators previously assumed a straight shape, so that now a resulting torque has moved the assembly to a center position.

Figure 16:
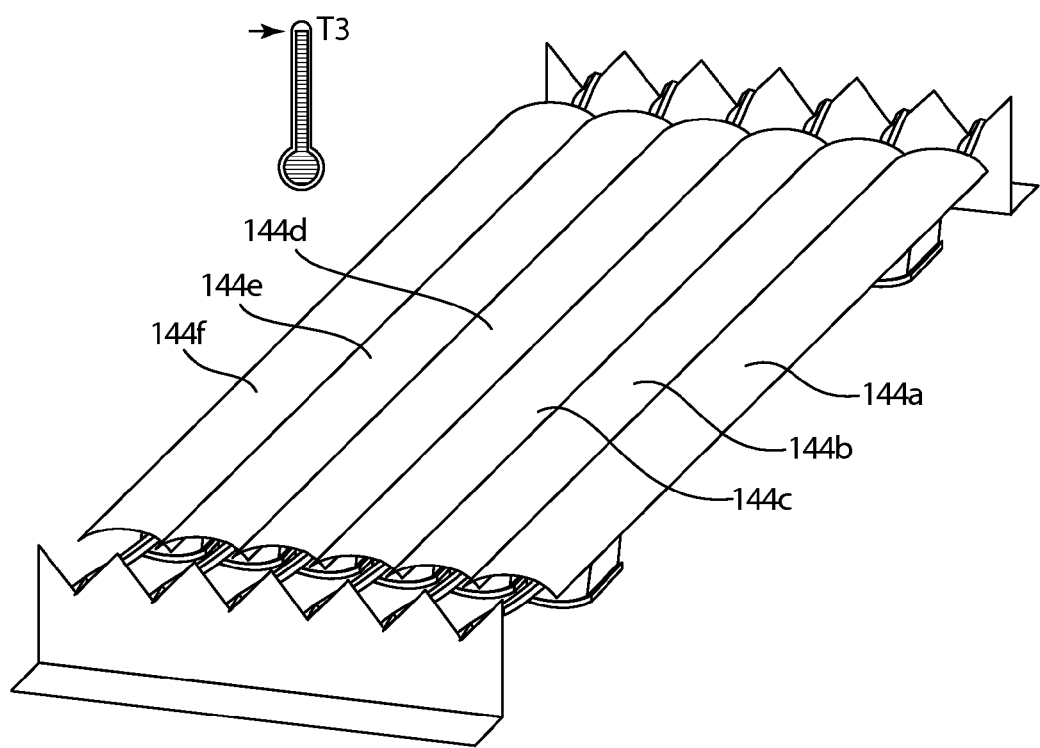
FIG. 16 shows the array of shutter element assemblies of FIG. 14 at elevated temperature T3.

FIG. 16 shows the array of shutter element assemblies of FIG. 14 at elevated temperature T3, so that the end pieces of the effectors are resting on the right side of the V-notches as a result of the shape, curved in the second direction, assumed by the effectors, and the shutter elements are in a closed position.

Figure 17:
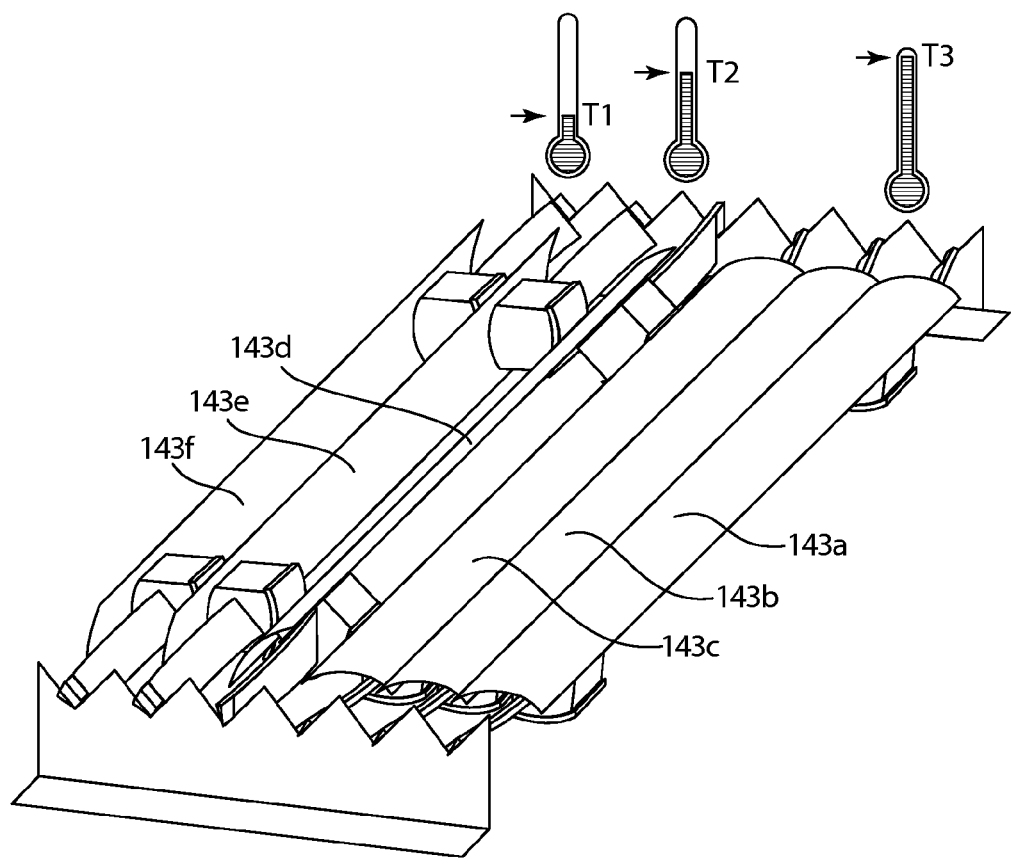
FIG. 17 shows an array of shutter element assemblies, similar to the array of FIG. 14, wherein the operating characteristics of actuators in the array have been adjusted so that, at a given temperature, a first group of actuators causes their corresponding shutter elements to be in the open position; a second group of actuators causes their corresponding shutter elements to be in an intermediate position, and a third group of actuators causes their corresponding shutter elements to be in the closed position.

FIG. 17 shows an array of shutter element assemblies, similar to the array of FIG. 14, wherein the operating characteristics of actuators in the array have been adjusted so that, at a given temperature, a first group of actuators causes their corresponding shutter elements 143e and 143f to be in the open position; a second group of actuators causes their corresponding shutter element 143d to be in an intermediate position, and a third group of actuators causes their corresponding shutter elements 143a, 143b, and 143c to be in the closed position.

FIGS. 18a-18d illustrate an array of shutter element assemblies, in which each shutter element assembly is implemented as a single actuator, and wherein the assemblies can be coupled together by an interconnect member illustrated in FIG. 18b. In this embodiment, the array of shutter element assemblies is illustrated as simply an array of actuators 183a, 183b, 183c, 183d, 183e, and 183f that are each similar to the actuator, in FIG. 4. As in prior figures, one set of the ends of each actuator, here represented as 184a, 184b, 184c, 184d, 184e, and 184f, are configured to rest in corresponding V-notches in suspension mount 181, and the opposite set of the ends of each actuator, here represented as 185a, 185b, 185c, 185d, 185e, and 185f, are configured to rest in corresponding V-notches in suspension mount 182. In an alternative embodiment, each shutter element assembly is implemented with an assembly such as illustrated in FIGS. 9 and 10. In FIG. 18a, each actuator 183a, 183b, 183c, 183d, 183e, and 183f includes a slot 186a, 186b, 186c, 186d, 186e, and 186f respectively, at the bottom of which is an upward facing knife edge. A rigid, single-piece notched interconnect shown in FIG. 18b is used to couple the assemblies together. Each of the notches 1871a, 1871b, 1871c, 1871d, 1871e, and 1871f goes into the corresponding slot 186a, 186b, 186c, 186d, 186e, and 186f respectively, with each notch engaging the upward facing knife edge of its corresponding slot, so that the interconnect forces the shutters, here the actuators, to move in unison. It should be noted that if shutter assemblies such as illustrated in FIGS. 9 and 10 are employed instead of the simple actuators of FIG. 4, an interconnect similar to that of FIG. 18b can still be employed, and slots (with upward facing knife edges at the bottom of each slot) can be formed in a set of actuators on one side of the array to receive the interconnect. and can be oriented so that each notch in the interconnect 18b coincides with the upward facing knife edge in the corresponding slot in an actuator of the array. FIG. 18c, the actuators are flexed to the right, so that the center of gravity has been shifted to the right, tending to cause the actuators to rotate toward the other side of the V-notches in the suspension mounts 181 (and 182. The arrows in FIG. 18b depict forces which would act to decrease or increase the transition temperature T2 previously discussed. It should be noted that the down-facing edges in one set of the ends of each actuator, here represented, for example, as 184a, 184b, 184c, 184d, 184e, and 184f, can be configured so as to compensate for the extra weight of the interconnect and to keep the assembly balanced at the transition temperature. T2. When the temperature has shifted sufficiently, then the actuators simultaneously rotate to the high temperature position as the interconnect moves to the right.

Accordingly, depending on the direction of rotation of the actuator (which serves here as a shutter), the interconnect will move in a first direction (to the left) or in a second direction (to the right). The interconnect member travels in first and second directions transverse to the axes of rotation of the assemblies, and the directions depend on the direction of rotation of shutters in the array with change in temperature. In a further related embodiment, the array is configured so as to have for each actuator serving as a shutter first and second rotation limit stops with separately adjustable angular positions, about the longitudinal axis, relative to the vertical plane. The embodiment is implemented by providing adjustable first and second translation limit stops on travel of the interconnect in the first and second directions. Because travel of the interconnect is restricted by the translation limit stops, so also is rotation of the effectors (shutters) similarly restricted.

Figure 20A:
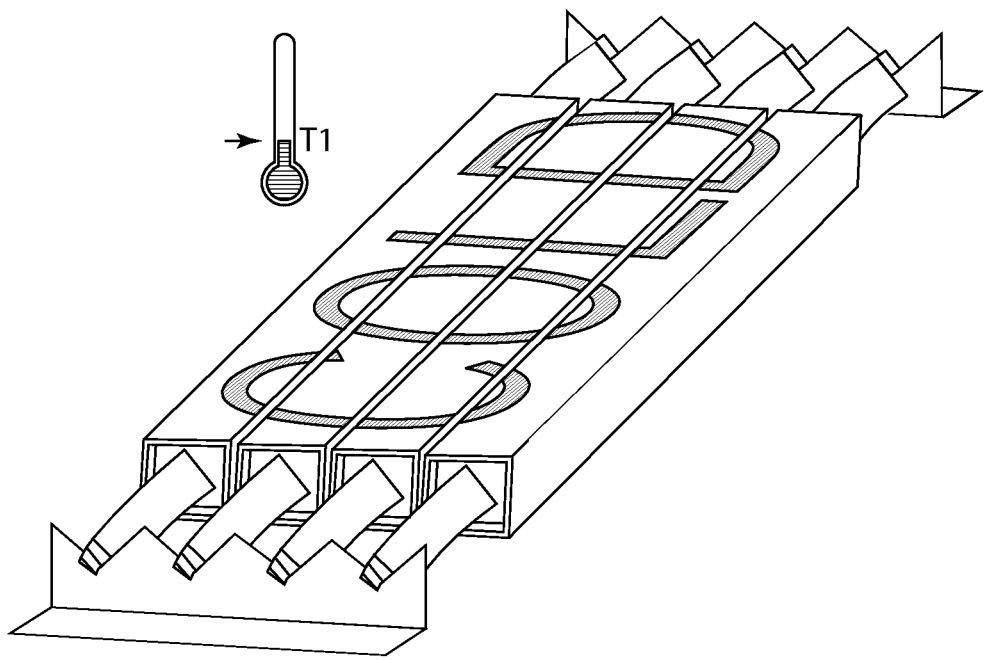
FIGS. 20a and 20b show an array of shutter element assemblies using rectangular parallelepipeds according to FIGS. 19a-19c.
Figure 20B:
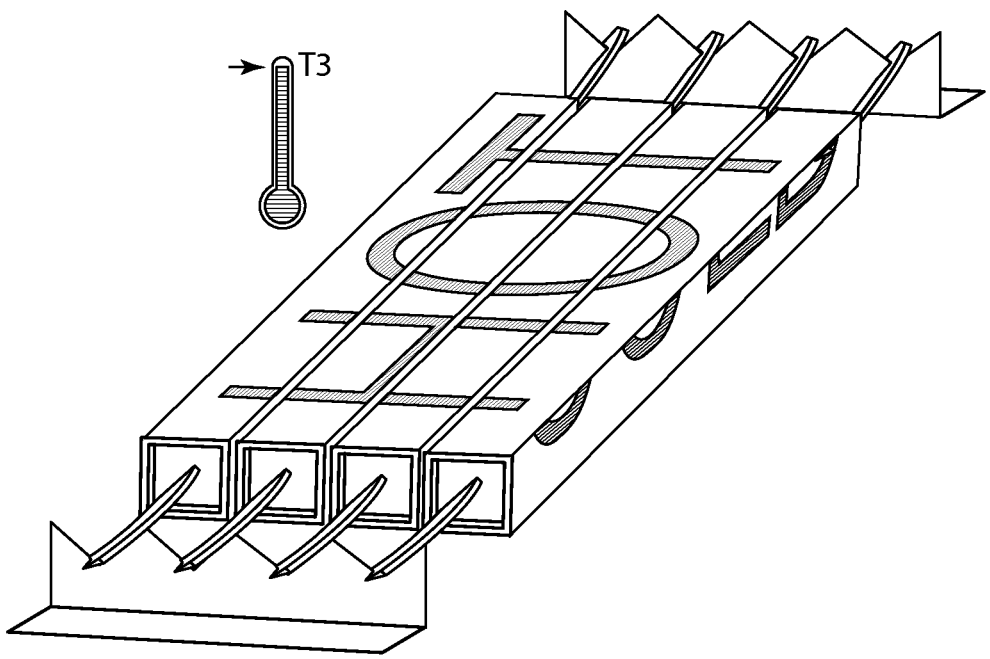

FIGS. 19a-19c illustrate a shutter element assembly wherein the shutter element is a rectangular parallelepiped. FIG. 19a is an exploded perspective view; FIG. 19b is an assembled perspective view; and FIG. 19c is an end view, showing the center of gravity of the assembly with a "+" or an "X" symbol. In these figures, the structure of the shutter element is generally similar to that shown in FIG. 9, except that the rectangular parallelepiped 191 replaces the shutter 93 of FIG. 9. The parallelepiped is mounted on hubs 92a and 92b, which in turn are coupled to effectors 91a and 91b respectively. Because the parallelepiped and the hubs 92a and 92b exhibit symmetry of sorts with respect to the rotational axis AA, it may be feasible to omit the counterweights 94a and 94b of FIG. 9, because as indicated in FIG. 19c, the center of gravity may lie on the axis of rotation of the assembly. FIGS. 20a and 20b show an array of shutter element assemblies according to FIGS. 19a-19c. The choice of a parallelepiped for the shutter is propitious, because the V-notches in the suspension mounts 181 and 182 of FIG. 18a can be configured to structure the rotation of the shutter through 90 degrees when there is a sufficient change in temperature between T1 and T3, which will cause a change in which face of the parallelepiped shows to a viewer of the array. Thus, in FIG. 20a, the exposed faces of the parallelepipeds of the array are used to spell "COLD" or other suitable message when the array temperature is at or below T1. Similarly, in FIG. 20b, the exposed faces of the parallelepipeds of the array are used to spell "HOT" or other suitable message when the array temperature is at or above T3. In a related embodiment of the present invention, the underside of the array may also be used for display purposes, and in such a case a separate temperature-dependent message may be place on the remaining two faces of the parallelepipeds.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A temperature-driven mechanical system comprising:
a first effector, made of temperature-induced shape-changing material, having first and second ends and a longitudinal axis running through at least one of the ends;
a suspension system that mounts an assembly including the first effector, to support rotation of the assembly about the longitudinal axis;
the suspension system having first and second rotation limit stops to limit rotation of the assembly to less than 180 degrees about the longitudinal axis, wherein the first rotational limit stop is associated with a first angular position of the assembly at or below a first temperature limit and the second rotational limit stop is associated with a second angular position of the assembly at or above a second temperature limit;
wherein the suspension system is configured so that at the first temperature limit the first effector assumes a first shape that causes the center of gravity of the assembly to be located on a first side of a vertical plane passing through the longitudinal axis and at the second temperature limit the first effector assumes a second shape that causes the center of gravity of the assembly to be located on a second side of the vertical plane, so that a temperature-induced change in shape of the first effector harnesses gravity to cause motion of the first effector between the first and second rotation limit stops.

2. A temperature-driven mechanical system according to claim 1, wherein (i) the assembly includes a second effector having first and second ends and the longitudinal axis also runs through at least one of the first and second ends of the second effector and (ii) the second effector is disposed in the assembly so that the effectors in the assembly exhibit bilateral symmetry.

3. A temperature-driven mechanical system according to claim 2, further comprising a shutter element mounted in the assembly.

4. A temperature-driven mechanical system according to claim 3, wherein the shutter element is implemented as a rectangular parallelepiped having a major axis that is parallel to the axis of rotation, and two adjacent faces of the parallelepiped display distinct messages, so that temperature of the effectors determines which of the distinct messages is visible to a viewer.

5. A temperature-driven mechanical system according to claim 1, further comprising a shutter element mounted in the assembly.

6. A temperature-driven mechanical system according to claim 5, further comprising a counterweight mounted in the assembly configured to cause the assembly to have a center of gravity located in the vertical plane passing through the longitudinal axis at a transition temperature between the first temperature limit and the second temperature limit.

7. A temperature-driven mechanical system according to claim 5, wherein the shutter element is reflective.

8. A temperature-driven mechanical system according to claim 5, wherein the shutter element is light-filtering in that it is configured to selectively pass primarily light falling within a selected frequency range.

9. A temperature-driven mechanical system according to claim 5, wherein the shutter element is configured to regulate air flow.

10. An array of temperature-driven mechanical systems according to claim 5, the array configured so that the longitudinal axes of the temperature-driven mechanical systems in the array are substantially parallel to one another.

11. An array of temperature-driven mechanical systems according to claim 10, the array configured so that the longitudinal axes of the temperature-driven mechanical systems are substantially co-planar.

12. An array of temperature-driven mechanical systems according to claim 11, wherein a plurality of assemblies are coupled to one another, so that they rotate in unison.

13. An array of temperature-driven mechanical systems according to claim 12, wherein each of the shutter elements is implemented as a rectangular parallelepiped having a major axis that is parallel to the axis of rotation, and two adjacent faces of the parallelepiped display distinct messages, so that temperature of the effectors determines which of the distinct messages is visible to a viewer.

14. An array of temperature-driven mechanical systems according to claim 12, wherein for each temperature-driven mechanical system, the first and second rotation limit stops have separately adjustable angular positions, about the longitudinal axis, relative to the vertical plane.

15. An array of temperature-driven mechanical systems according to claim 14, wherein the plurality of assemblies are coupled to one another via an interconnect member that is coupled to each shutter element of the array and that travels in first and second directions transverse to the axes of rotation of the assemblies, the directions depending on the direction of rotation of the shutter elements in the array with change in temperature, the array further comprising adjustable first and second translation limit stops on travel of the interconnect member in the first and second directions.

16. An array of temperature-driven mechanical systems according to claim 12, further comprising a temperature limit adjustment mechanism configured to provide a torque to the assemblies with respect to their axes of rotation so as to shift the temperature limits at which centers of gravity of the assemblies in the array generate torque sufficient to cause rotation of the assemblies.

17. An array of temperature-driven mechanical systems according to claim 16, wherein the temperature limit adjustment mechanism includes a spring with an adjustable amount of force.

18. An array of temperature-driven mechanical systems according to claim 16, wherein the temperature limit adjustment mechanism includes a weight with an adjustable lever arm.

19. An array of temperature-driven mechanical systems according to claim 16, further comprising a manual override assembly configured to cause the shutter elements to move into and be retained in a state determined by manual operation.

20. A temperature-driven mechanical system according to claim 1, wherein the first and second rotation limit stops have separately adjustable angular positions, about the longitudinal axis, relative to the vertical plane.

\* \* \* \* \*